US010630786B2

(12) United States Patent
Srinivasa Gopalan et al.

(10) Patent No.: US 10,630,786 B2
(45) Date of Patent: Apr. 21, 2020

(54) METHOD FOR MAINTAINING A PERSISTENT MIRACAST SESSION OVER WIRELESS LINK

(71) Applicant: Samsung Electronics Co., Ltd., Gyeonggi-do (KR)

(72) Inventors: Karthik Srinivasa Gopalan, Bangalore (IN); Mayuresh Madhukar Patil, Bangalore (IN); Byung-Moo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 251 days.

(21) Appl. No.: 15/069,417

(22) Filed: Mar. 14, 2016

(65) Prior Publication Data
US 2016/0270145 A1 Sep. 15, 2016

(30) Foreign Application Priority Data

Mar. 13, 2015 (IN) .......................... 1265/CHE/2015
Feb. 2, 2016 (IN) .......................... 1265/CHE/2015

(51) Int. Cl.
H04L 29/08 (2006.01)
H04L 29/06 (2006.01)
(Continued)

(52) U.S. Cl.
CPC .......... H04L 67/16 (2013.01); H04L 65/1083 (2013.01); H04L 65/1096 (2013.01);
(Continued)

(58) Field of Classification Search
CPC . H04W 76/021; H04W 76/028; H04W 84/12; H04L 67/16
See application file for complete search history.

(56) References Cited

U.S. PATENT DOCUMENTS

2011/0285917 A1 11/2011 Murase et al.
2013/0185447 A1* 7/2013 Nagawade .............. H04L 69/32
709/228
(Continued)

FOREIGN PATENT DOCUMENTS

CN 102325271 1/2012
CN 103402137 11/2013
(Continued)

OTHER PUBLICATIONS

"Wi-Fi Display Technical Specification Version 1.1", 2014, Wi-Fi Alliance.*
(Continued)

Primary Examiner — Peter P Chau
(74) Attorney, Agent, or Firm — The Farrell Law Firm, P.C.

(57) ABSTRACT

A method for maintaining a persistent miracast session over a wireless link is provided. The method includes establishing a persistent miracast session with a sink device, storing at least one of an identifier of the sink device, a session identifier, and configuration parameters, and verifying at least one of the stored identifier of the sink device, the stored session identifier, and the stored configuration parameters to reestablish the persistent miracast session between the source device and the sink device over the wireless link.

13 Claims, 11 Drawing Sheets

(51) Int. Cl.
*H04W 76/11* (2018.01)
*H04L 29/14* (2006.01)
*H04W 84/12* (2009.01)
*H04W 76/19* (2018.01)

(52) U.S. Cl.
CPC ........ *H04L 65/4084* (2013.01); *H04L 67/146* (2013.01); *H04L 69/40* (2013.01); *H04W 76/11* (2018.02); *H04W 76/19* (2018.02); *H04W 84/12* (2013.01)

(56) References Cited

U.S. PATENT DOCUMENTS

| | | | |
|---|---|---|---|
| 2013/0234913 A1* | 9/2013 | Thangadorai | G06F 3/1423 345/2.1 |
| 2014/0096164 A1 | 4/2014 | Bei et al. | |
| 2014/0334381 A1 | 11/2014 | Subramaniam et al. | |
| 2014/0347433 A1* | 11/2014 | Kafle | H04L 65/1069 348/14.02 |
| 2014/0365611 A1 | 12/2014 | Praveenkumar et al. | |
| 2015/0036735 A1 | 2/2015 | Smadi et al. | |
| 2016/0192419 A1* | 6/2016 | Lee | H04W 48/16 370/329 |
| 2016/0261905 A1* | 9/2016 | Aruga | H04L 41/0806 |
| 2016/0337838 A1* | 11/2016 | Lee | H04W 48/14 |
| 2016/0343346 A1* | 11/2016 | Lee | G09G 5/005 |
| 2017/0171892 A1* | 6/2017 | Lee | H04W 76/10 |

FOREIGN PATENT DOCUMENTS

| | | | |
|---|---|---|---|
| CN | 103582165 | 2/2014 | |
| EP | 2 661 144 | 11/2013 | |
| WO | WO 2014051403 A1 * | 4/2014 | ........... H04W 76/10 |

OTHER PUBLICATIONS

European Search Report dated Jan. 23, 2018 issued in counterpart application No. 16765214.8-1213, 12 pages.
International Search Report dated Jul. 13, 2016 issued in counterpart application No. PCT/KR2016/002500, 12 pages.
Chinese Office Action dated Dec. 24, 2019 issued in counterpart application No. 201680015272.6, 52 pages.

* cited by examiner

METHOD FOR MAINTAINING A PERSISTENT MIRACAST SESSION OVER WIRELESS LINK

PRIORITY

This application claims priority under 35 U.S.C. § 119(a) to Indian Provisional Patent Application Serial No. 1265/CHE/2015(PS), which was filed in the Indian Intellectual Property Office on Mar. 13, 2015 and Indian Complete Patent Application Serial No. 1265/CHE/2015(CS), which was filed in the Indian Intellectual Property Office on Feb. 2, 2016, the entire disclosure of each of these applications is incorporated herein by reference.

BACKGROUND 1.1. Field of the Disclosure

The present disclosure relates generally to a Wireless Fidelity (Wi-Fi) network, and more particularly, to a mechanism for maintaining a persistent miracast (which is a screen-mirroring protocol that lets a user broadcast anything from an Android® device or recent Intel® computer to a TV) session over a wireless link.

2.2. Description of the Related Art

Mobile and wireless technologies have been experiencing rapid growth over the past several years. This growth has been fueled by better communications, hardware, and more reliable protocols. Wireless service providers are now able to offer their customers an ever-expanding array of features and services, and provide users with unprecedented levels of access to information, resources, and communications. As mobile devices and wireless technologies continue to improve and grow in popularity, short-range wireless technologies are expected to replace the need for connecting devices together using cables or wires. As part of this evolution, a number of new technologies and standards (e.g., miracast, Wi-Fi Display (WFD) standard, etc.) have emerged that allow high-speed unidirectional wireless communication between electronic devices. The use of these emerging technologies/standards in unconventional ways provide users of mobile devices with access to new and improved communication services, functionalities, and capabilities will be beneficial to consumers of the mobile devices.

Generally, the WFD standard has been defined to transmit audio/video (AV) data while satisfying high quality and low latency. A WFD network is a network system suggested by the Wi-Fi Alliance® that enables Wi-Fi devices to be connected to each other in a peer-to-peer (P2P) fashion without participating in a home network, an office network, or a hot-spot network. The Wi-Fi devices within a WFD network may be capable of discovering information relating to each other, e.g., capability information, establishing a WFD session, and rendering content received during the WFD session. Typically, a WFD network comprises a Wi-Fi source device and either one or more Wi-Fi sink devices.

In the conventional systems and methods, a source device acts as a multi-media content provider device. In order to stream multi-media content, the source device discovers a sink device(s). Then, the source device performs service discovery with the sink devices to determine a type of services to be used at the sink devices. Thereafter, the source device establishes a miracast connection with the discovered sink devices. Further, the source device sends a WFD capability request frame to the sink devices over a wireless link. In response, the sink devices send a WFD capability response frame. The WFD capability response frame contains capability information and an audio and video intent value associated with a respective sink device. Accordingly, the capability information is exchanged and negotiated between the source device and the sink devices.

For example, the capability information exchanged and negotiated between the source device and the respective sink device can include audio/video parameters such as audio/video codec's, resolution, frames per second, and time synchronization parameters. Then, the source device establishes a miracast session with the respective sink device. Further, the source device streams multimedia content to the respective sink device during the miracast session. When the miracast session is torn down (stopped) between the source device and the respective sink device, in order to reestablish the miracast session, it is required to perform miracast capability exchange and reconfigure the codec's and ports prior to establishing the miracast session, thereby introducing additional latency in reestablishing the miracast session between the source device and the respective sink device.

An aspect of the present disclosure, is to provide a mechanism for maintaining a persistent miracast session between a source device and a sink device over a wireless link.

Another aspect of the present disclosure, is to provide a mechanism for establishing a persistent miracast session with the sink device.

Yet another aspect of the present disclosure, is to provide a mechanism for storing at least one of an identifier of the sink device, a session identifier, and configuration parameters.

Still another aspect of the present disclosure, is to provide a mechanism for verifying at least one of the stored identifier of the sink device, the stored session identifier, and the stored configuration parameters to reestablish the persistent miracast session between the source device and the sink device over the wireless link.

Still another aspect of the present disclosure, is to provide a mechanism for receiving a capability request message from the source device to identify whether the sink device supports a persistent miracast session.

Yet another aspect of the present disclosure, is to provide a mechanism for sending a capability response message indicating that the sink device supports the persistent miracast session to the source device.

Still another aspect of the present disclosure, is to provide a mechanism for receiving a persistent miracast session configuration message from the source device.

In accordance with an aspect of the present disclosure, there is provided a method for maintaining a persistent miracast session over a wireless link. The method includes establishing, by a source device, a persistent miracast session with a sink device, storing, at the source device, at least one of an identifier of the sink device, a session identifier, and configuration parameters, and verifying, by the source device, at least one of the stored identifier of the sink device, the stored session identifier, and the stored configuration parameters to reestablish the persistent miracast session between the source device and the sink device over the wireless link.

In accordance with an aspect of the present disclosure, there is provided a method for maintaining a persistent miracast session over a wireless link. The method includes receiving, by a sink device, a capability request message from a source device to identify whether the sink device supports a persistent miracast session, sending, by the sink device, a capability response message indicating that the sink device supports the persistent miracast session to the source device, receiving, by the sink device, a persistent miracast session configuration message from the source device, storing, by the sink device, at least one of an identifier of the source device, a session identifier, and configuration parameters, and sending, by the sink device, a verification response message to the source device to reestablish the persistent miracast session between the source device and the sink device over the wireless link.

In accordance with another aspect of the present disclosure, there is provided a source device for maintaining a persistent miracast session over a wireless link. The source device includes a controller unit configured to establish a persistent miracast session with a sink device, store at least one of an identifier of the sink device, a session identifier, and configuration parameters, and verify at least one of the stored identifier of the sink device, the stored session identifier, and the stored configuration parameters to reestablish the persistent miracast session between the source device and the sink device over the wireless link.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
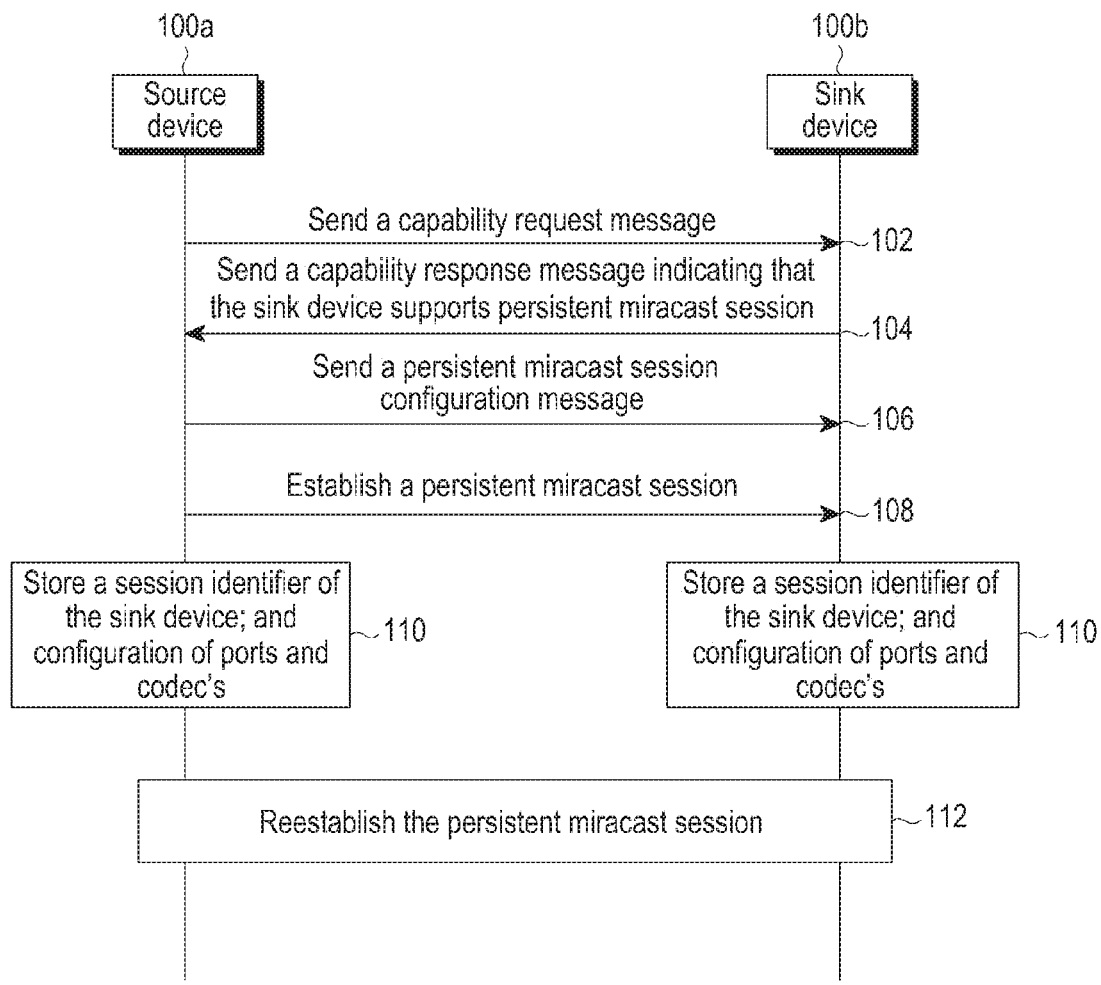
FIG. 1 is a sequence diagram illustrating a method for maintaining and reestablishing a persistent miracast session over a wireless link, according to an embodiment of the present disclosure.

The embodiments described herein and the various features and advantageous details thereof are explained more fully with reference to the non-limiting embodiments that are illustrated in the accompanying drawings and detailed in the following description. Descriptions of well-known components and processing techniques are omitted so as to not obscure the embodiments described herein. Also, the various embodiments described herein are not necessarily mutually exclusive, as some embodiments can be combined with one or more other embodiments to form new embodiments.

The term "or" as used herein, refers to a non-exclusive or, unless otherwise indicated. The examples used herein are intended merely to facilitate an understanding of the various ways in which the embodiments herein described can be practiced and to further enable those skilled in the art to practice the embodiments herein. Accordingly, the examples should not be construed as limiting the scope of the embodiments herein.

Accordingly embodiments herein disclose a method for maintaining a persistent miracast session over a wireless link. The method includes establishing a persistent miracast session with a sink device. Further, the method includes storing at least one of an identifier of the sink device, a session identifier, and configuration parameters. Further, the method includes verifying at least one of the stored identifier of the sink device, the stored session identifier, and the stored configuration parameters to reestablish the persistent miracast session between the source device and the sink device over the wireless link.

In an embodiment, the method includes sending a capability request message to the sink device to identify whether the sink device supports the persistent miracast session. Further, the method includes receiving a capability response message indicating that the sink device supports the persistent miracast session from the sink device. Further, the method includes sending a persistent miracast session configuration message to the sink device. Further, the method includes establishing the persistent miracast session with the sink device.

In an embodiment, the method includes sending a terminate request message including a teardown parameter to the sink device, where the tear down parameter indicates the sink device to tear down the persistent miracast session and retain the wireless link, between the source device and the sink device. Further, the method includes receiving a terminate response message from the sink device. Further, the method includes clearing persistent miracast session resources except the session identifier and the configuration parameters. Further, the method includes tearing down the persistent miracast session. Further, the method includes retaining the wireless link with the sink device. Further, the method includes sending a verification request message to the sink device to identify availability of the sink device for reestablishing the persistent miracast session with the stored session identifier when the persistent miracast session is torn down. Further, the method includes receiving a verification response message from the sink device, wherein the verification response message indicates the availability of the sink device.

In an embodiment, the method includes sending a service discovery request message including an identifier of the source device to the sink device over the wireless link. Further, the method includes receiving a service discovery response message including the session identifier from the sink device. Further, the method includes reestablishing the persistent miracast session with the sink device in response to detecting a match between the received session identifier and the stored session identifier, where the persistent miracast session is reestablished by bypassing a capability request message, a capability response message, and a miracast session configuration.

In an embodiment, the method includes sending the service discovery request message to the sink device over the wireless link. Further, the method includes receiving the service discovery response message including the identifier of the sink device, from the sink device. Further, the method includes verifying the received identifier with the stored identifier in the source device. Further, the method includes sending a Provision Discovery (PD) request message comprising the session identifier to the sink device when the received identifier and the stored identifier are verified. Further, the method includes receiving a PD response message from the sink device, where the PD response message indicates the source device to establish the persistent miracast session. Further, the method includes reestablishing the persistent miracast session with the sink device, where the persistent miracast session is reestablished by bypassing the capability request message, the capability response message, and the miracast session configuration.

In an embodiment, the method includes sending the service discovery request message to the sink device over the wireless link. Further, the method includes receiving the service discovery response message including the identifier of the sink device, from the sink device. Further, the method includes verifying the received identifier with the stored identifier in the source device. Further, the method includes sending an Application Session Protocol (ASP) session request message including the session identifier to the sink device when the received identifier and the stored identifier are verified. Further, the method includes reestablishing the persistent miracast session with the sink device, where the persistent miracast session is reestablished by bypassing the capability request message, the capability response message, and the miracast session configuration.

In an embodiment, the method includes sending the terminate request message including the tear down parameter to the sink device, where the tear down parameter indicates the sink device to tear down the persistent miracast session and the wireless link, between the source device and the sink device. Further, the method includes receiving the terminate response message from the sink device. Further, the method includes clearing persistent miracast session resources except the session identifier and the configuration parameters. Further, the method includes tearing down the persistent miracast session and the wireless link with the sink device.

In an embodiment, the method includes broadcasting a device discovery request message. Further, the method includes receiving a device discovery response message from the sink device. Further, the method includes establishing a wireless link with the sink device. Further, the method includes sending the service discovery request message including the identifier of the source device to the sink device over the wireless link. Further, the method includes receiving the service discovery response message including the session identifier from the sink device. Further, the method includes reestablishing the persistent miracast session with the sink device after detecting a match between the received session identifier and the stored session identifier, where the persistent miracast session is reestablished by bypassing the capability request message, the capability response message, and the miracast session configuration.

In an embodiment, the method includes broadcasting the device discovery request message. Further, the method includes receiving the device discovery response message from the sink device. Further, the method includes establishing the wireless link with the sink device. Further, the method includes sending the service discovery request message to the sink device over the wireless link. Further, the method includes receiving the service discovery response message including the identifier of the sink device, from the sink device. Further, the method includes verifying the received identifier with the stored identifier in the source device. Further, the method includes sending the PD request message including the session identifier to the sink device when the received identifier and the stored identifier are verified. Further, the method includes receiving the PD response message from the sink device, where the PD response message indicates the source device to reestablish the persistent miracast session. Further, the method includes reestablishing the persistent miracast session with the sink device, where the persistent miracast session is reestablished by bypassing the capability request message, the capability response message, and the miracast session configuration.

In an embodiment, the method includes broadcasting the device discovery request message. Further, the method includes receiving the device discovery response message from sink device. Further, the method includes establishing the wireless link with the sink device. Further, the method includes sending the service discovery request message to the sink device over the wireless link. Further, the method includes receiving the service discovery response message comprising the identifier of the sink device from the sink device. Further, the method includes verifying the received identifier with the stored identifier in the source device. Further, the method includes sending the ASP request message including the session identifier to the sink device when the received identifier and the stored identifier of the sink device are verified. Further, the method includes receiving an ASP session response message from the sink device, wherein the ASP session response message indicates the source device to reestablish the persistent miracast session. Further, the method includes reestablishing the persistent miracast session with the sink device, where the persistent miracast session is reestablished by bypassing the capability request message, the capability response message, and the miracast session configuration.

Another embodiment herein discloses a method for maintaining the persistent miracast session over the wireless link. The method includes receiving the capability request message from the source device to identify whether the sink device supports the persistent miracast session. Further, the method includes sending the capability response message indicating that the sink device supports the persistent miracast session to the source device. Further, the method includes receiving the persistent miracast session configuration message from the source device. Further, the method includes storing at least one of the identifier of the source device, the session identifier, and the configuration parameters. Further, the method includes sending a verification response message to the source device to reestablish the persistent miracast session between the source device and the sink device over the wireless link.

In an embodiment, the method includes receiving the terminate request message including the tear down parameter from the source device, where the tear down parameter indicates the sink device to tear down the persistent miracast session and retain the wireless link, between the source device and the sink device. Further, the method includes sending the terminate response message to the source after receiving the terminate request message. Further, the method includes clearing persistent miracast session resources except the session identifier and the configuration parameters. Further, the method includes receiving a verification request message from the source device to identify availability of the sink device for reestablishing the persistent miracast session with the stored session identifier when the persistent miracast session is torn down. Further, the method includes sending the verification response message to the source device, wherein the verification response message indicates the availability of the sink device.

In an embodiment, the method includes receiving the service discovery request message including the identifier of the source device from the source device over the wireless link. Further, the method includes verifying the received identifier with the stored identifier. Further, the method includes sending the service discovery response message including the session identifier from the source device.

In an embodiment, the method includes receiving the service discovery request message from the source device over the wireless link. Further, the method includes sending the service discovery response message including the identifier of the sink device to the source device. Further, the method includes receiving the PD request message including the session identifier from the source device. Further, the method includes sending the PD response message to the source device, where the PD response message indicates the source device to reestablish the persistent miracast session.

In an embodiment, the method includes receiving the service discovery request message from the source device over the wireless link. The method includes sending the service discovery response message including the identifier of the sink device to the source device. Further, the method includes receiving the ASP request message including the session identifier from the source device. Further, the method includes sending the ASP response message to the source device, where the ASP response message indicates the source device to reestablish the persistent miracast session.

In an embodiment, the method includes receiving the terminate request message including the tear down parameter from the source device, where the tear down parameter indicates the sink device to tear down the persistent miracast session and the wireless link, between the source device and the sink device. Further, the method includes sending the terminate response message to the source device. Further, the method includes clearing the persistent miracast session resources except the session identifier and the configuration parameters.

In an embodiment, the method includes receiving the broadcasted device discovery request message from the source device. Further, the method includes sending the device discovery response message to the source device for establishing the wireless link between the sink device and the source device. Further, the method includes receiving the service discovery request message including the identifier of the source device from the source device over the wireless link. Further, the method includes sending the service discovery response message including the session identifier to the source device for reestablishing the persistent miracast session.

In an embodiment, the method includes receiving the device discovery request message broadcasted by the source device. Further, the method includes sending the device discovery response message to the source device for establishing the wireless link. Further, the method includes receiving the service discovery request message from the source device over the wireless link. Further, the method includes sending the service discovery response message including the identifier of the sink device to the source device. Further, the method includes receiving the PD request message including the session identifier from the source device. Further, the method includes sending the PD response message to the source device, where the PD response message indicates the source device to establish the persistent miracast session.

In an embodiment, the method includes receiving the device discovery request message broadcasted by the source device. Further, the method includes sending the device discovery response message to the source device for establishing the wireless link with the sink device. Further, the method includes receiving the service discovery request message from the source device over the wireless link. Further, the method includes sending the service discovery response message including the identifier of the sink device to the source device. Further, the method includes receiving the ASP session request message including the session identifier from the source device. Further, the method includes sending the ASP session response message to the source device, wherein the ASP session response message indicates the source device to reestablish the persistent miracast session.

Unlike conventional methods and systems, the methods described herein provide a mechanism, for maintaining a persistent miracast service session between a source device and a sink device. Moreover, the methods described herein provide a mechanism to preserve the miracast session state when an established miracast session is torn down (in case of a persistent miracast connection), to indicate a capability of maintaining the persistent miracast connection. A session identifier can be communicated to the source device and the sink device. The session identifier can be used for reestablishing the persistent miracast connection between the source device and sink device.

Unlike conventional systems and methods, once the capability to support the persistent miracast connection is exchanged between the source device and the sink device, and by identifying the miracast session as the persistent miracast session, the source device and the sink device can store the configuration parameters. When the persistent miracast session needs to be reestablished, the session identifier and a Media Access Control (MAC) address can be communicated to the source device/sink device to identify the session as the persistent miracast session. The persistent miracast session can then be reestablished without the capability exchange or the configuration of codecs and ports. Thus, leading to faster setup and improved user experience.

FIG. 1 is a sequence diagram for maintaining and reestablishing a persistent miracast session over a wireless link, according to an embodiment of the present invention. As illustrated in FIG. 1, a source device 100a and a sink device 100b (or a plurality of sink devices 100a) are configured to communicate over the wireless link during a miracast session. The source device 100a can be, for example, a laptop, a desktop computer, a mobile phone, a smart phone, Personal Digital Assistants (PDAs), a tablet, a phablet, or the like. The sink device 100b can be, for example, a Television (TV), a projector, or the like.

At step 102, the source device 100a sends a capability request message (i.e., capability request frame) to the sink device 100b to identify whether the sink device 100b supports the persistent miracast session. The source device 100a queries the sink device 100b on its capability to support the persistent miracast session; this is performed using a M3 query message with a new parameter wfd_persistent_connection, which is standard message defined in the miracast protocol, and the miracast protocol defines a sequence to communication and control messages. The M3 message has no expansion.

At step 104, after receiving the capability request message, the sink device 100b sends a capability response message (i.e., capability request frame) to the source device 100a indicating that the sink device 100b supports the persistent miracast session. The capability response message includes capability information and audio/video intent value associated with the sink device 100b. The capability information is exchanged and negotiated between the source device 100a and the sink device 100b and includes audio/video parameters such as audio/video codec's, resolution, frames per second, time synchronization parameters, or the like.

If the sink device 100b supports the persistent miracast session then, the sink device 100b responds to the source device in the M3 query response message with the new parameter wfd_persistent_connection set to "YES". If the sink device 100b does not support the persistent miracast session then, the sink device 100b responds to the source device in the M3 query response message with the new parameter wfd_persistent_connection set to "NO".

At step 106, after detecting that the sink device 100b supports the persistent miracast service session, the source device 100a sends a persistent miracast session configuration message to the sink device 100b. I the sink device 100b supports the persistent miracast session then the source device 100a sets up the persistent miracast connection using the M5 message, which includes characteristics similar to the M3 message, including the new parameter wfd_persistent_connection set to "YES".

At step 108, the source device 100a establishes the persistent miracast session with the sink device 100b.

At step 110, the source device 100a stores the identifier of the sink device 100b, the session identifier (i.e., the session identifier of the persistent miracast session) and configuration parameters to reestablish the persistent miracast session between the source device 100a and the sink device 100b over the wireless link. Similarly, the sink device 100b stores the identifier of the source device 100a, the session identifier, and the configuration parameters. The source device 100a and the sink device 100b store the session identifier of the persistent miracast session, and codec configuration and port information (i.e., configuration parameters) as part of a persistent information. The MAC address of the sink device 100b is stored at the source device 100a as an identifier of the sink device 100b. Further, the MAC address of the source device 100a is stored at the sink device 100b as an identifier of the source device 100a.

At step 112, the source device 100a reestablishes the persistent miracast session with the sink device 100b using the stored parameters. The functionalities of the source device 100a and the sink device 100b are described in greater detail below with respect to the FIGS. 2A-4B.

Figure 2A:
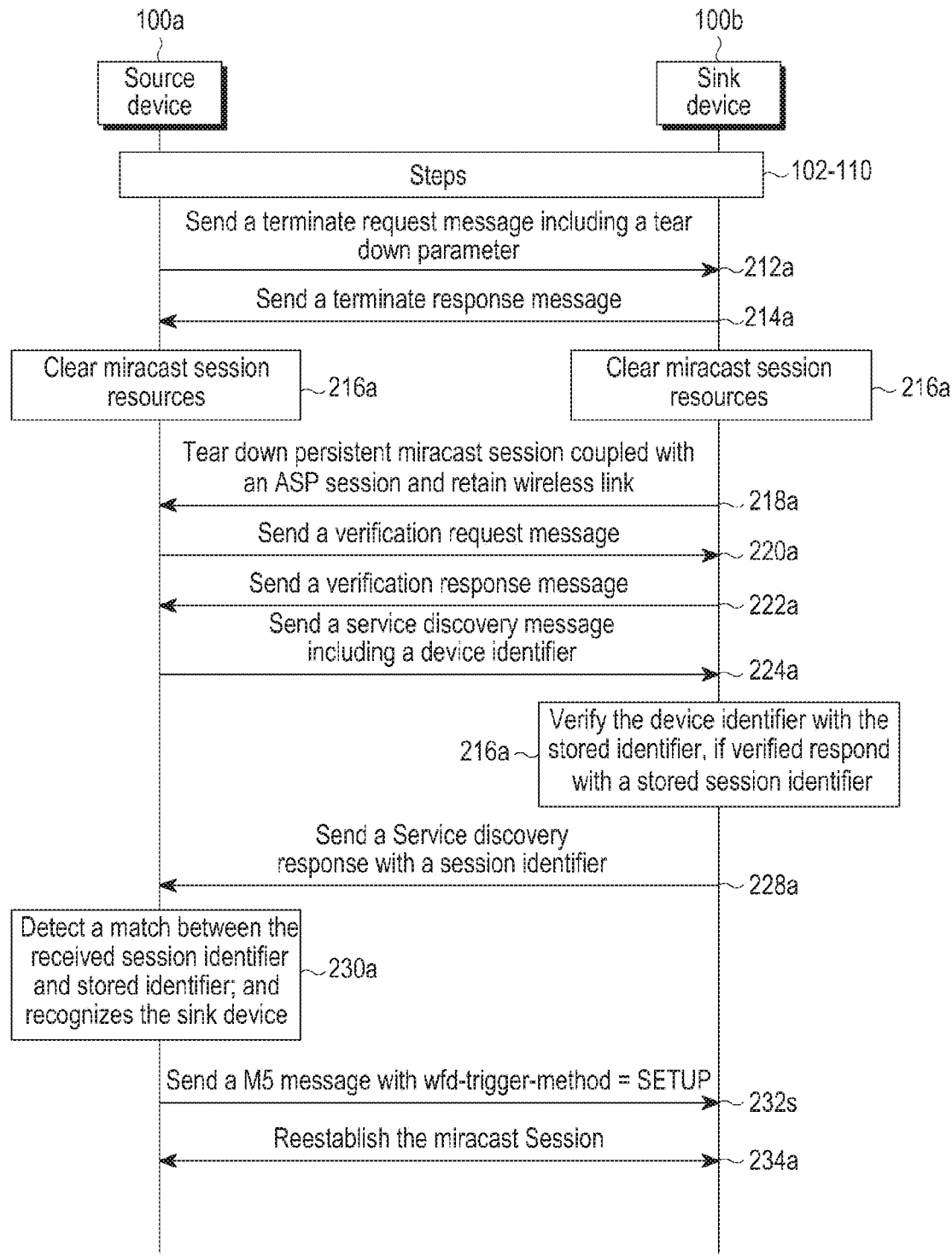
FIG. 2A is a sequence diagram illustrating a method for maintaining and reestablishing the persistent miracast session using a service discovery request message when the wireless link is retained on miracast tear down, according to an embodiment of the present disclosure.

FIG. 2A is a sequence diagram illustrating a method for maintaining and reestablishing the persistent miracast session using a service discovery request message when the wireless link is retained on miracast tear down, according to an embodiment of the present disclosure.

The steps 202a-210a replicate the steps 102-110 as described in the FIG. 1. Thus, the steps 202a-210a are not shown in FIG. 2A, and a corresponding description thereof is omitted.

At step 212a, the source device 100a sends a terminate request message including a tear down parameter to the sink device 100b. The tear down parameter instructs the sink device 100b to tear down the persistent miracast session and retain the wireless link between the source device 100a and the sink device 100b. When the source device 100a decides to terminate the persistent miracast session, the source device 100a sends a M5 message with a new trigger parameter set to RTSP_TEARDOWN_ONLY; this indicates to the sink device 100b that the underlying wireless link (i.e., Peer-to-Peer (P2P) link or infra-layer link) has to be retained and the persistent miracast session coupled with an application session protocol (ASP) session will be torn down.

At step 214a, after receiving the terminate request message, the sink device 100b sends a terminate response message to the source device 100a. The sink device 100b responds to the M5 message with the new trigger parameter set to RTSP_TEARDOWN_ONLY with a RTSP M5 response OK.

At step 216a, the source device 100a clears persistent miracast session resources except for the session identifier and the configuration parameters. Similarly, the sink device 100b clears the persistent session resources except for the session identifier and the configuration parameters.

At step 218a, the source device 100a tears down the persistent miracast session coupled with the ASP session and retains the wireless link (i.e., underlying P2P connection) with the sink device 100b.

At step 220a, the source device 100a sends a verification request message to the sink device 100b to identify availability of the sink device 100b for reestablishing the persistent miracast session with the stored session identifier when the persistent miracast session is torn down.

At step 222a, the sink device 100b sends a verification response message to the source device 100a, where the verification response message indicates the availability of the sink device 100b.

At step 224a, when the source device 100a selects to reestablish the persistent miracast session, the source device 100a sends a service discovery request message including the identifier (i.e., MAC address) of the source device 100a to the sink device 100b over the wireless link. The source device 100a initiates the service discovery on the existing P2P/infra-layer link to identify the existence of the miracast session.

At step 226a, after receiving the service discovery request message, the sink device 100b verifies the identifier with the stored identifier of the source device 100a. The sink device 100b verifies that the received MAC address is the stored MAC address of the source device 100a.

At step 228a, after verifying that the received identifier is the stored identifier, the sink device 100b sends a service discovery response message including the session identifier of the persistent miracast session to the source device 100a.

At step 230a, after receiving the session identifier, the source device 100a detects a match between the received session identifier and the stored session identifier. If the match is detected, the source device 100a recognizes the sink device 100b and directly initiates a setup for reestablishing the persistent miracast session. The source device 100a matches the session identifier with a list of stored session identifier and recognizes the sink device 100b for directly initiating the setup bypassing the capability discovery and capability configuration steps.

At step 232a, the source device 100a sends a M5 message "wfd-trigger-method=SETUP" to setup the persistent miracast session.

At step 234a, the source device 100a reestablishes the persistent miracast session with the sink device 100b so that data can be transferred. The persistent miracast session is reestablished by bypassing a capability request message, a capability response message, and a miracast session configuration.

The various steps described with respect to FIG. 2A may be performed in the order presented, in a different order or simultaneously. Further, some of the steps may be omitted, added, modified, skipped, or the like without departing from the scope of the disclosure.

Figure 2B:
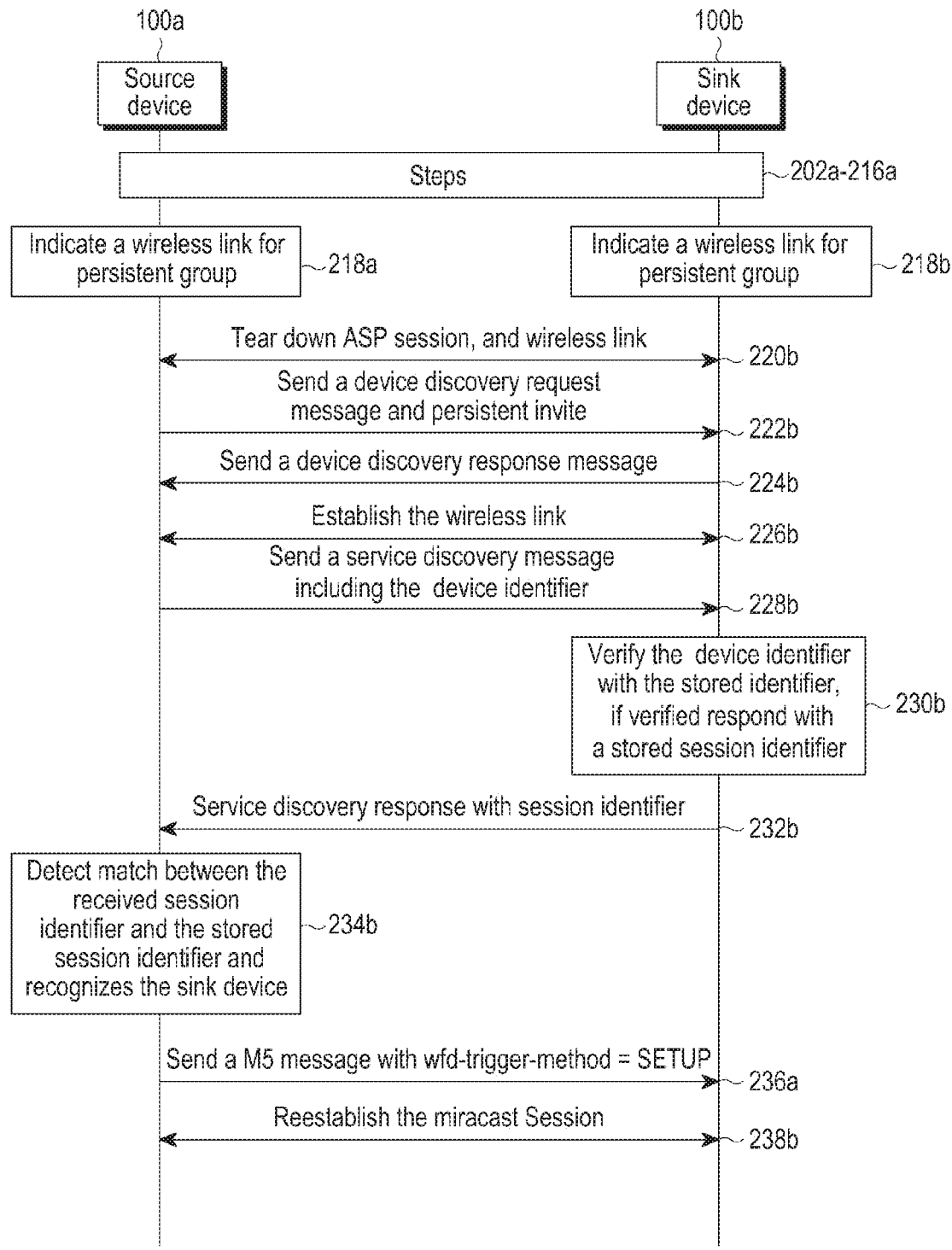
FIG. 2B is a sequence diagram illustrating a method for maintaining and reestablishing the persistent miracast session using the service discovery message when the wireless link and the miracast session are torn down, according to an embodiment of the present disclosure.

FIG. 2B is a sequence diagram illustrating a method for maintaining and reestablishing the persistent miracast session using the service discovery message when the wireless link and the miracast session are torn down, according to an embodiment of the present disclosure.

The steps 202b-216b replicate the steps 202a-216a as described in the FIG. 2A. Thus, the steps 202b-216b are not shown in FIG. 2B, and a corresponding description thereof is omitted.

At step 218b, the source device 100a indicates the wireless link for persistent group. The source device 100a indicates P2P/ASP/infra layer for the persistent group. Similarly, the sink device 100b indicates the P2P/ASP/infra layer for the persistent group.

At step 220b, the persistent miracast session coupled with the ASP session and the wireless link (P2P link/infra link) between the source device 100a and the sink device 100b are torn down.

At step 222b, after tearing down the wireless link and persistent miracast session coupled with the ASP session, the source device 100a broadcasts a device discovery request message and persistent invite.

At step 224b, after detecting the device discovery request message broadcasted by the source device 100a, the sink device 100b sends a device discovery response message to the source device 100a.

At step 226b, after receiving the device discovery response message, the source device 100a establishes the wireless link with the sink device 100b.

At step 228b, when the source device 100a selects to reestablish the persistent miracast session, the source device 100a sends the service discovery request message including the identifier of the source device 100a to the sink device 100b over the wireless link. The source device 100a initiates the service discovery on the existing P2P connection to identify the existence of the miracast session.

At step 230b, after receiving the service discovery request message including the identifier of the source device 100a, the sink device 100b verifies that the identifier is the stored identifier of the source device 100a. The sink device 100b verifies the received MAC address is the stored MAC address of the source device 100a.

At step 232b, after verifying that the received identifier is the stored identifier of the source device 100a, the sink device 100b sends the service discovery response message including the session identifier of the persistent miracast session to the source device 100a.

At step 234b, after receiving the session identifier, the source device 100a detects the match between the received session identifier and the stored session identifier. If the match is detected, the source device 100a recognizes the sink device 100b and directly initiates the setup for reestablishing the persistent miracast session. The source device 100a matches the session identifier with the list of stored session identifier and recognizes the sink device 100b for directly initiating the setup bypassing the capability discovery and capability configuration steps.

At step 236b, the source device 100a sends the M5 message "wfd-trigger-method=SETUP" to setup the persistent miracast session.

At step 238b, the source device 100a reestablishes the persistent miracast session with the sink device 100b so that data can be transferred. The persistent miracast session is reestablished by bypassing the capability request message, the capability response message, and the miracast session configuration.

The various steps of FIG. 2B may be performed in the order presented, in a different order or simultaneously. Further, some of the steps may be omitted, added, modified, skipped, or the like without departing from the scope of the disclosure.

Figure 3A:
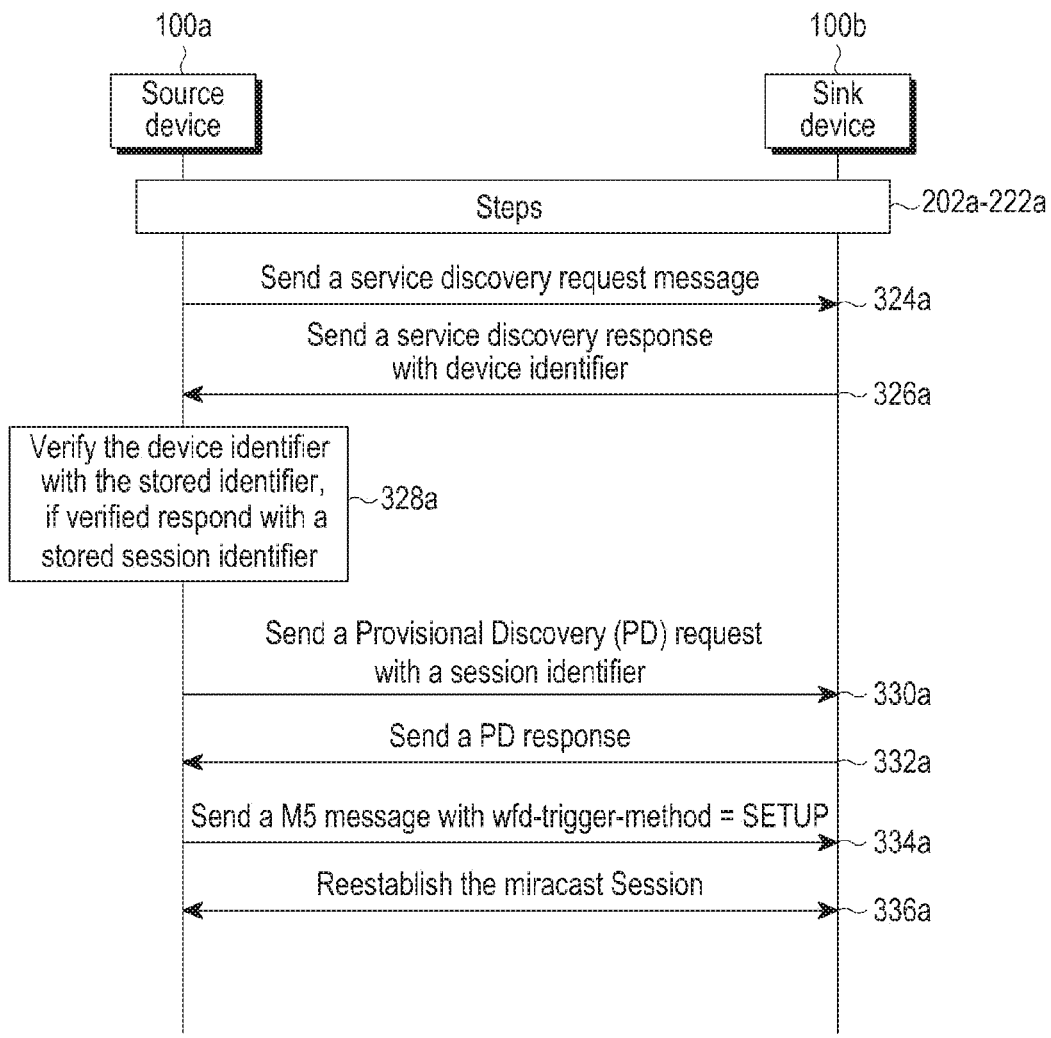
FIG. 3A is a sequence diagram illustrating a method for maintaining and reestablishing the persistent miracast session using a Provisional Discovery (PD) request message when the wireless link is retained on miracast tear down, according to an embodiment of the present disclosure.

FIG. 3A is a sequence diagram illustrating a method for maintaining and reestablishing the persistent miracast session using a Provisional Discovery (PD) request message when the wireless link is retained on miracast tear down, according to an embodiment of the present disclosure. The steps 302a-318a replicate the steps 202a-222a as described in the FIG. 2A. Thus, the steps 302a-322a are not shown in FIG. 3A, and a corresponding description thereof is omitted.

At step 324a, when the source device 100a selects to reestablish the persistent miracast session, the source device 100a sends the service discovery request message to the sink device 100b over the wireless link. The source device 100a initiates the service discovery on the existing P2P link to identify the existence of the miracast session.

At step 326a, after receiving the service discovery request message, the sink device 100b sends the service discovery response message including the identifier of the sink device 100b to the source device 100a.

At step 328a, after receiving the service discovery response message including the identifier of the sink device 100b, the source device 100a verifies that the identifier is the stored identifier of the sink device 100b. The source device 100a verifies that the received MAC address is the stored MAC address of the sink device 100b.

At step 330a, after the verification of the MAC address, the source device 100a sends the PD request message including the session identifier to the sink device 100b for identifying the persistent miracast connection.

At step 332a, after receiving the PD request message including the session identifier, the sink device 100b sends the PD response message to the source device 100a. The PD response message instructs the source device 100a to reestablish the persistent miracast session. The sink device 100b responds with the PD response message confirming that the source device 100a can establish the persistent miracast session.

At step 334a, the source device 100a sends the M5 message "wfd-trigger-method=SETUP" to setup the persistent miracast session with the sink device 100b.

At step 336a, the source device 100a reestablishes the persistent miracast session with the sink device 100b so that data can be transferred. The persistent miracast session is reestablished by bypassing the capability request message, the capability response message, and the miracast session configuration.

The various steps in FIG. 3A may be performed in the order presented, in a different order or simultaneously. Further, some of the steps may be omitted, added, modified, skipped, or the like without departing from the scope of the disclosure.

Figure 3B:
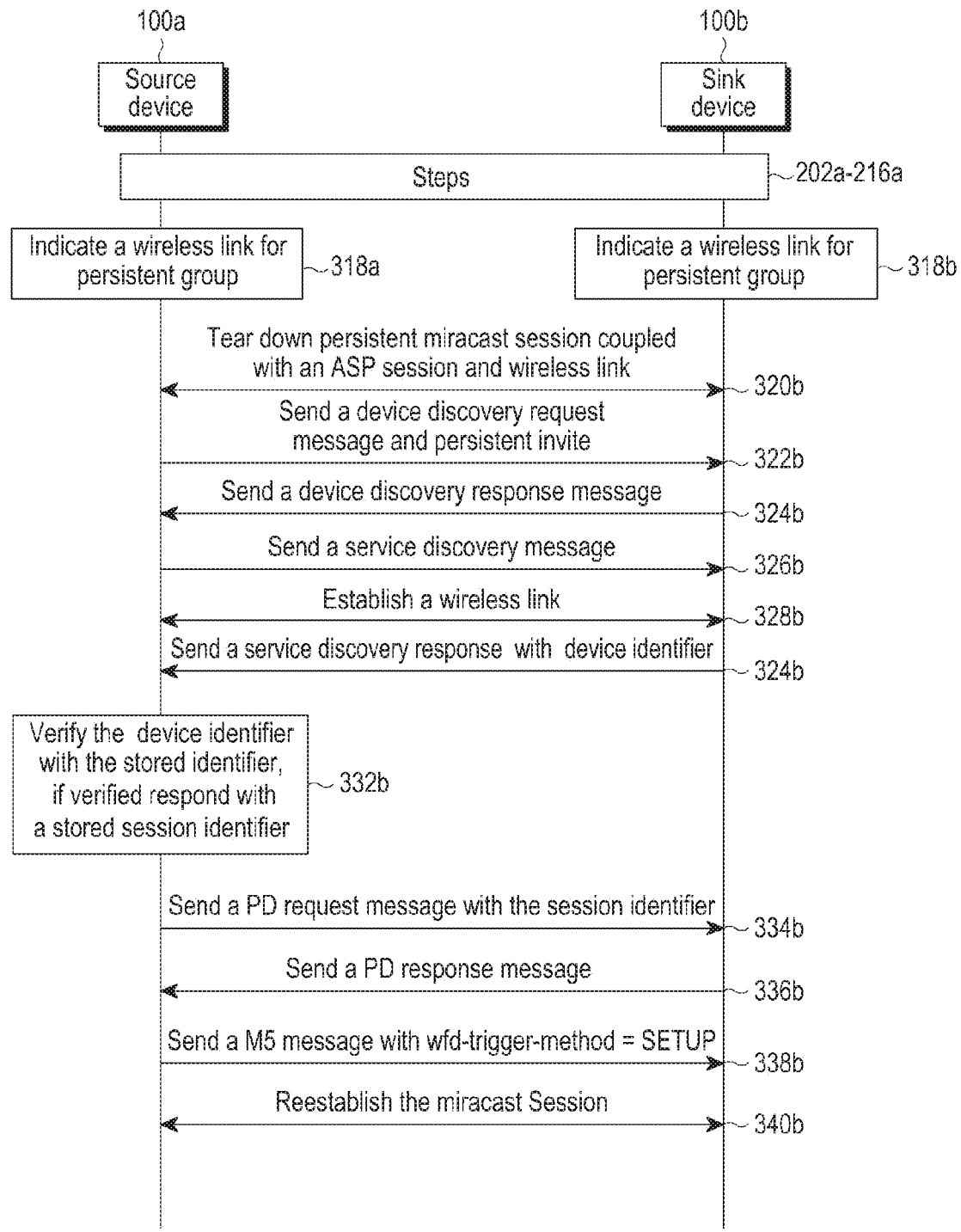
FIG. 3B is a sequence diagram illustrating a method for maintaining and reestablishing the persistent miracast session using the PD request message when the wireless link and the miracast session are torn down, according to an embodiment of the present disclosure.

FIG. 3B is a sequence diagram illustrating a method for maintaining and reestablishing the persistent miracast session using the PD request message when the wireless link and the miracast session are torn down, according to an embodiment of the present disclosure.

The steps 302b-316b replicate the steps 202a-216a as described in the FIG. 2A. Thus, the steps 302b-316b are not shown in FIG. 3B, and a corresponding description thereof is omitted.

At step 318b, the source device 100a indicates the wireless link for persistent group. The source device 100a indicates P2P/ASP/infra layer for the persistent group. Similarly, the sink device 100b indicates the P2P/ASP/infra layer for the persistent group.

At step 320b, the persistent miracast session coupled with the ASP session and the wireless link (P2P/infra link) between the source device 100a and the sink device 100b are torn down.

At step 322b, after tearing down the wireless link and the persistent miracast session coupled with the ASP session, the source device 100a broadcast the device discovery request message and the persistent invite.

At step 324b, after detecting the device discovery request message broadcasted by the source device 100a, the sink device 100b sends the device discovery response message to the source device 100a.

At step 326b, the source device 100a sends the service discovery request message to the sink device 100b.

At step 328b, after receiving the service discovery request message, the source device 100a establishes the wireless link with the sink device 100b.

At step 330b, after receiving the service discovery request message, the sink device 100b sends the service discovery response message including the identifier of the sink device 100b to the source device 100a.

At step 332b, after receiving the service discovery response message, the source device 100a verifies the received identifier of with the stored identifier of the sink device 100b in the source device 100a.

At step 334b, the source device 100a sends the PD request message including the stored session identifier to the sink device 100b when the received identifier of the sink device 100b and the stored identifier of the sink device 100b are verified.

At step 336b, after receiving the PD request message, the sink device 100b sends the PD response message to the source device 100a, where the PD response message indicates the source device 100a to establish the persistent miracast session.

At step 338b, the source device 100a sends the M5 message "wfd-trigger-method=SETUP" to setup the persistent miracast session.

At step 340b, the source device 100a reestablishes the persistent miracast session with the sink device 100b, where the persistent miracast session is reestablished by bypassing the capability request message, the capability response message, and the miracast session configuration.

The various steps in FIG. 3B may be performed in the order presented, in a different order or simultaneously. Further, some of the steps may be omitted, added, modified, skipped, or the like without departing from the scope of the disclosure.

Figure 4A:
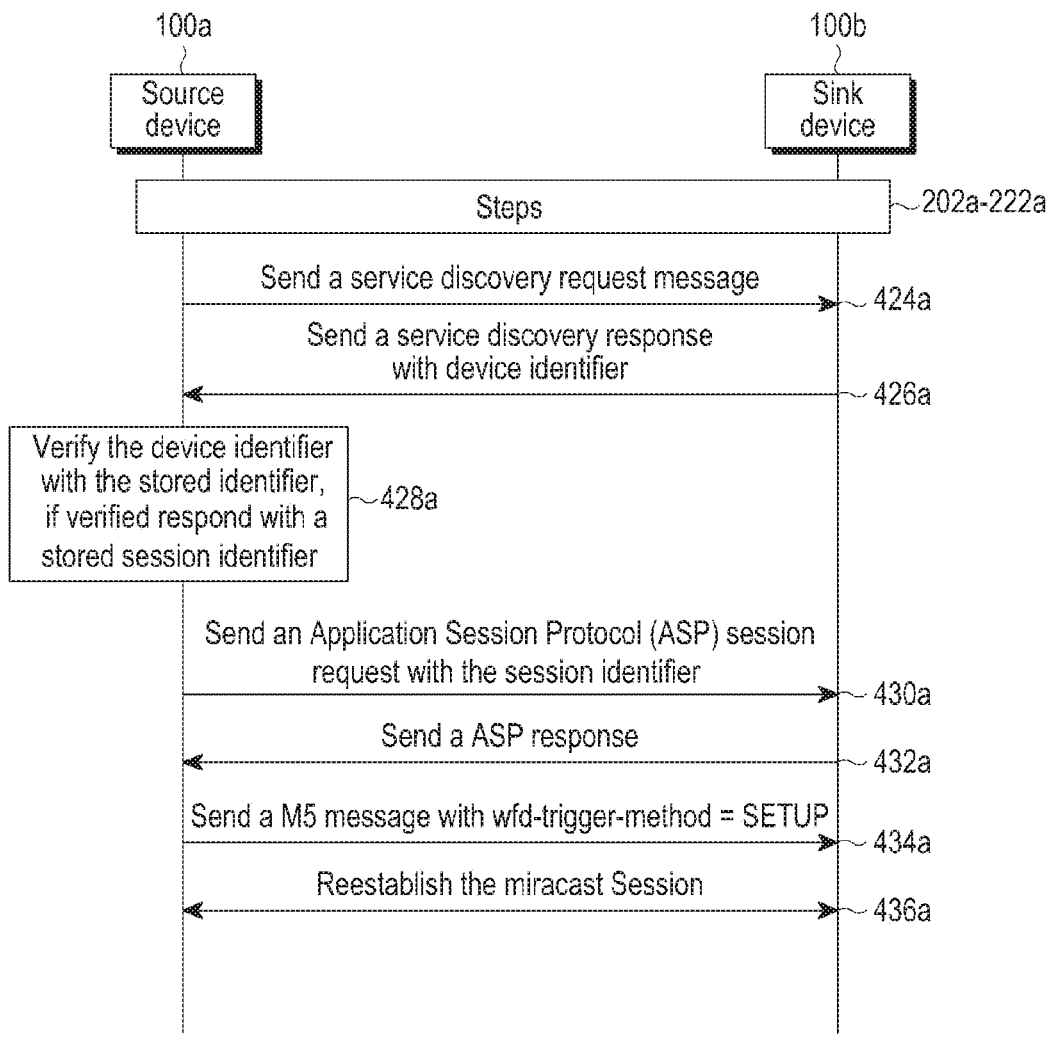
FIG. 4A is a sequence diagram illustrating a method for maintaining and establishing the persistent miracast session using an Application Session Protocol (ASP) request message when the wireless link is retained on miracast tear down, according to an embodiment of the present disclosure.

FIG. 4A is a sequence diagram illustrating a method for maintaining and establishing the persistent miracast session using the ASP request message when the wireless link is retained on miracast tear down, according to an embodiment of the present disclosure.

The steps 402a-422a replicate the steps 202a-222a as described in the FIG. 2A. Thus, the steps 402a-422a are not shown in FIG. 4A, and a corresponding description thereof is omitted.

At step 424a, when the source device 100a selects or determines to reestablish the persistent miracast session, the source device 100a sends the service discovery request message to the sink device 100b over the wireless link. The source device 100a initiates the service discovery on the existing P2P link to identify the existence of the miracast session.

At step 426a, after receiving the service discovery request message, the sink device 100b sends the service discovery response message including the identifier of the sink device 100b to the source device 100a.

At step 428a, after receiving the service discovery response message including the identifier of the sink device 100b, the source device 100a verifies that the identifier is the stored identifier of the sink device 100b. The source device 100a verifies that the received MAC address is the stored MAC address of the sink device 100b.

At step 430a, after the verification of the MAC address, the source device 100a sends the ASP request message including the session identifier to the sink device 100b for identifying the persistent miracast connection. The source device 100a initiates the persistent miracast connection by providing the session identifier in the ASP request message specifically in the ASP seek Instance primitive as instance name. The instance name is used by the ASP to identify a stored session identifier that can be then re-established.

At step 432a, after receiving the ASP request message including the session identifier, the sink device 100b sends the ASP response message to the source device 100a. The sink device 100b responds with the ASP response message confirming that the source device 100a can establish the persistent miracast session.

At step 434a, the source device 100a sends the M5 message "wfd-trigger-method=SETUP" to setup the persistent miracast session.

At step 436a, the source device 100a reestablishes the persistent miracast session with the sink device 100b so that data can be transferred. The persistent miracast session is reestablished by bypassing the capability request message, the capability response message, and the miracast session configuration.

The various steps in FIG. 4A may be performed in the order presented, in a different order or simultaneously. Further, some of the steps may be omitted, added, modified, skipped, or the like without departing from the scope of the disclosure.

Figure 4B:
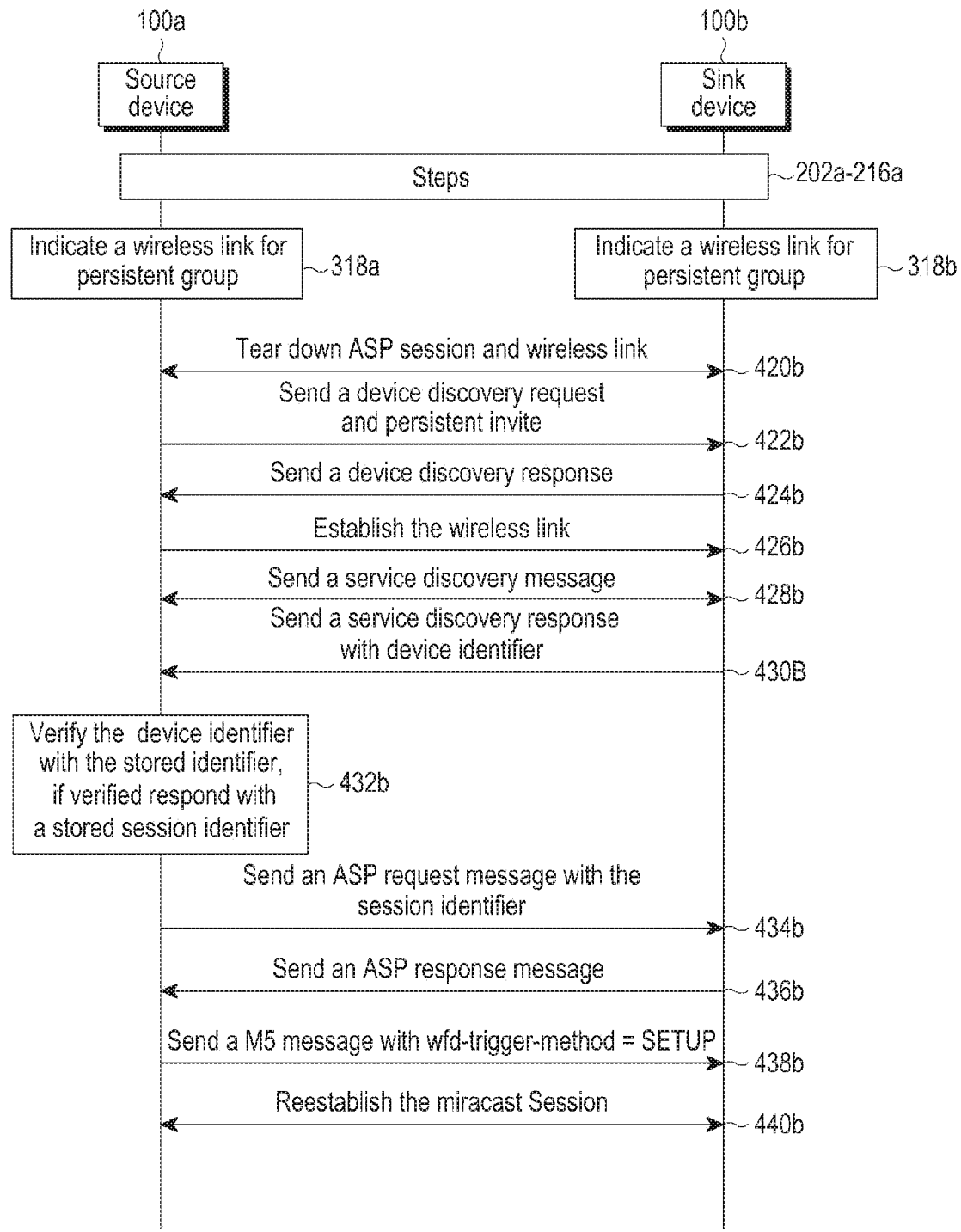
FIG. 4B is a sequence diagram illustrating a method for maintaining and establishing the persistent miracast session using the ASP request message when the wireless link and the miracast session are torn down, according to an embodiment of the present disclosure.

FIG. 4B is a sequence diagram illustrating a method for maintaining and establishing the persistent miracast session using the ASP request message when the wireless link and the miracast session are torn down, according to an embodiment of the present disclosure.

Steps 402b-416b replicate the steps 202a-216a as described in the FIG. 2A. Thus, the steps 402b-416b are not shown in FIG. 4B, and a corresponding description is omitted.

At step 418b, the source device 100a indicates the wireless link for persistent group. The source device 100a indicates P2P/ASP/infra layer for the persistent group. Similarly, the sink device 100b indicates the wireless link for the persistent group.

At step 420b, the ASP session and the wireless link (P2P/infra link) is torn down between the source device 100a and the sink device 100b.

At step 422b, after tearing down the wireless link and the ASP session, the source device 100a broadcasts the device discovery request message and the persistent invite message.

At step 424b, after detecting the device discovery request message and the persistent invite message broadcasted by the source device 100a, the sink device 100b sends the device discovery response message to the source device 100a.

At step 426b, after receiving the device discovery response message, the source device 100a establishes the wireless link with the sink device 100b.

At step 428b, when the source device 100a selects to reestablish the persistent miracast session, the source device 100a sends the service discovery request message to the sink device 100b over the wireless link.

At step 430b, after receiving the service discovery request message, the sink device 100b sends the service discovery response message including the identifier of the sink device 100b to the source device 100a.

At step 432b, after receiving the service discovery request message, the source device 100a verifies the received identifier with the stored identifier of the sink device 100b in the source device 100a.

At step 434b, the source device 100a sends the ASP request message including the session identifier to the sink device 100b when the received identifier of the sink device 100b and the stored identifier of the sink device 100b are verified.

At step 436b, after receiving the ASP request message, the sink device 100b sends the ASP response message to the source device 100a, where the ASP response message instructs the source device 100a to establish the persistent miracast session.

At step 438b, the source device 100a sends the M5 message "wfd-trigger-method=SETUP" to setup the persistent miracast session.

At step 440b, the source device 100a reestablishes the persistent miracast session with the sink device 100b, where the persistent miracast session is reestablished by bypassing the capability request message, the capability response message, and the miracast session configuration.

The various steps in FIG. 4B may be performed in the order presented, in a different order or simultaneously. Further, some of the steps may be omitted, added, modified, skipped, or the like without departing from the scope of the disclosure.

Figure 5A:
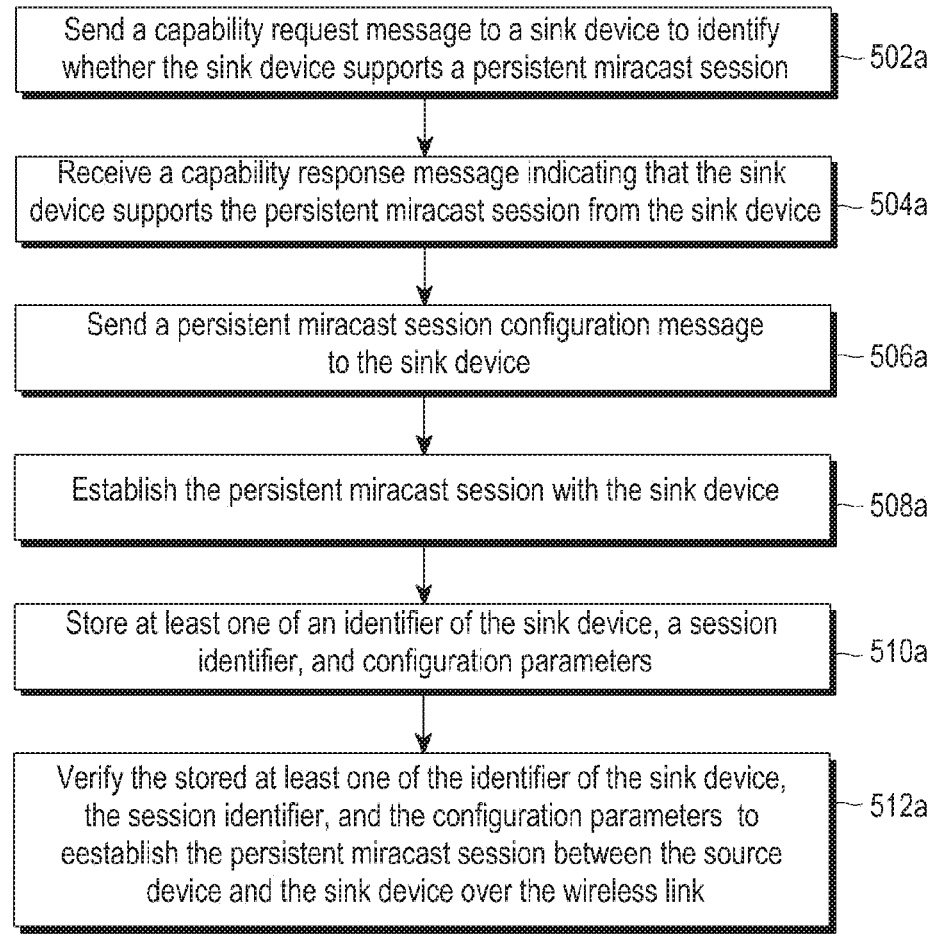
FIG. 5A is a flowchart illustrating a method for establishing the persistent miracast session over the wireless link, according to an embodiment of the present disclosure.

FIG. 5A is a flowchart illustrating a method for establishing the persistent miracast session over the wireless link, according to an embodiment of the present disclosure. At step 502a, the source device 100a sends the capability request message to the sink device 100b to identify whether the sink device 100b supports the persistent miracast session.

At step 504a, the source device 100a receives the capability response message indicating that the sink device 100b supports the persistent miracast session from the sink device 100b.

At step 506a, the source device 100a sends the persistent miracast session configuration message to the sink device 100b.

At step 508a, the persistent the source device 100a establishes the persistent miracast session with the sink device 100b.

At step 510a, the source device 100a stores the at least one of the identifier of the sink device 100b, the session identifier, and the configuration parameters. At step 512a, the source device 100a verifies at least one of the stored identifier of the sink device 100b, the stored session identifier, and the stored configuration parameters to reestablish the persistent miracast session with the sink device 100b over the wireless link.

The persistent miracast session can be established using the service discovery request message when the wireless link is retained on the miracast tear down, as described above with respect to FIG. 2A. The persistent miracast session can be established using the service discovery request message when the wireless link and the miracast session are torn down, as described above with respect to FIG. 2B. The persistent miracast session can be established using the PD request message when the wireless link is retained on the miracast tear down, as described above with respect to FIG. 3A. The persistent miracast session can be established using the PD request message when the wireless link and the miracast session are torn down, as described above with respect to FIG. 3B. The persistent miracast session can be established using the ASP request message when the wireless link is retained on the miracast tear down, as described above with respect to FIG. 4A. The persistent miracast session can be established using the ASP request message when the wireless link and the miracast session are torn down, as described above with respect to FIG. 4B.

The various actions, acts, blocks, steps, or the like described with respect to FIG. 5A may be performed in the order presented, in a different order or simultaneously. Further, some of the actions, acts, blocks, steps, or the like may be omitted, added, modified, skipped, or the like.

Figure 5B:
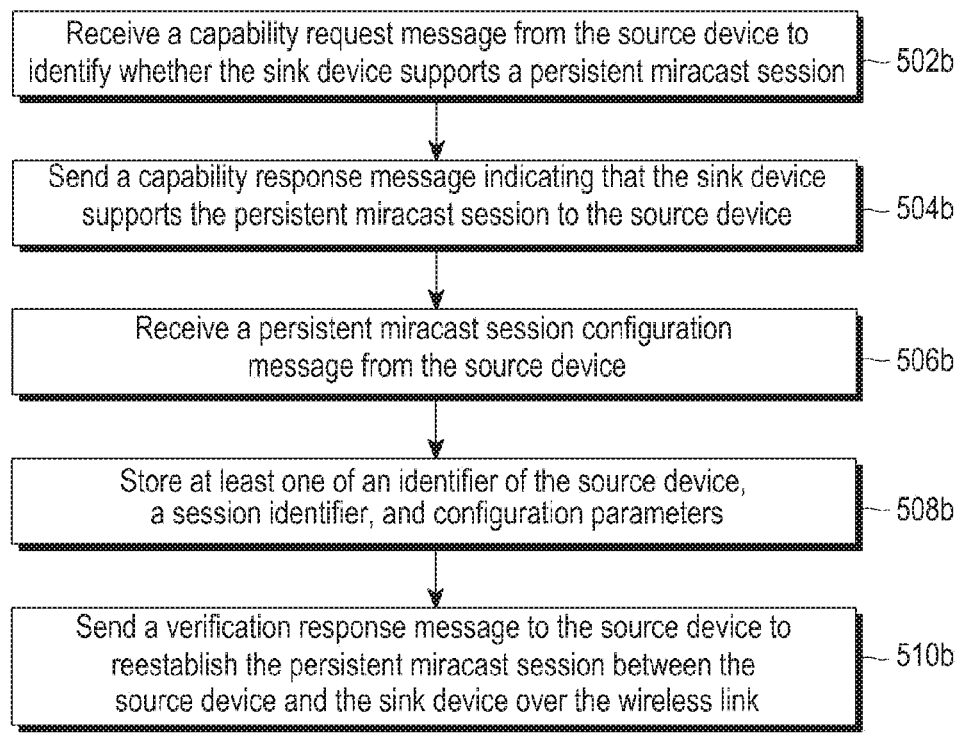
FIG. 5B is a flowchart illustrating a method for maintaining the persistent miracast session over the wireless link, according to an embodiment of the present disclosure.

FIG. 5B is a flowchart illustrating a method for maintaining the persistent miracast session over the wireless link, according to an embodiment of the present disclosure. At step 502b, the sink device 100b receives the capability request message from the source device 100a to identify whether the sink device 100b supports the persistent miracast session.

At step 504b, the sink device 100b sends the capability response message indicating that the sink device 100b supports the persistent miracast session to the source device 100a. At step 506b, the sink device 100b receives the persistent miracast session configuration message from the source device 100a.

At step 508b, the sink device 100b stores the at least one of the identifier of the source device 100a, the session identifier, and the configuration parameters. At step 510b, the sink device 100b sends the verification response message to the source device 100a to reestablish the persistent miracast session between the source device and the sink device over the wireless link.

The various actions, acts, blocks, steps, or the like described with respect to FIG. 5B may be performed in the order presented, in a different order or simultaneously. Further, some of the actions, acts, blocks, steps, or the like may be omitted, added, modified, skipped, or the like.

Figure 6:
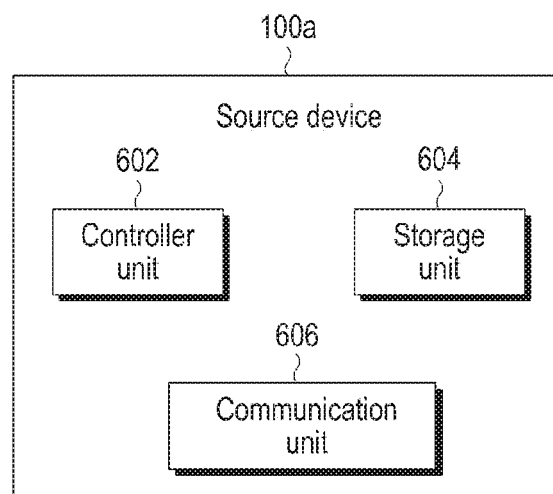
FIG. 6 is a diagram illustrating components of a source device, according to an embodiment of the present disclosure.

FIG. 6 is a diagram illustrating the various components of the source device 100a, according to an embodiment of the present disclosure. The source device 100a includes a controller unit 602, a storage unit 604, and a communication unit 606.

The controller unit 602 can be configured to establish the persistent miracast session with the sink device 100b. The controller unit 602 can be configured to store at least one of the identifier of the sink device 100b, the session identifier, and configuration parameters. The controller unit 602 can be configured to verify at least one of the stored identifier of the sink device 100b, the stored session identifier, and the stored configuration parameters to reestablish the persistent miracast session between the source device 100a and the sink device 100b over the wireless link.

The controller unit 602 can be configured to send the capability request message to the sink device 100b to identify whether the sink device 100b supports the persistent miracast session. The controller unit 602 can be configured to receive the capability response message indicating that the sink device 100b supports the persistent miracast session from the sink device 100b. The controller unit 602 can be configured to send the persistent miracast session configuration message to the sink device 100b. The controller unit 602 can be configured to establish the persistent miracast session with the sink device 100b.

The controller unit 602 can be configured to send the terminate request message including the tear down parameter to the sink device 100b, where the tear down parameter instructs the sink device 100b to tear down the persistent miracast session and retain the wireless link between the source device 100a and the sink device 100b. The controller unit 602 can be configured to receive the terminate response message from the sink device 100b. The controller unit 602 can be configured to clear the persistent miracast session resources except for the session identifier and the configuration parameters. The controller unit 602 can be configured to tear down the persistent miracast session. The controller unit 602 can be configured to retain the wireless link with the sink device 100b. The controller unit 602 can be configured to send the verification response message to the sink device 100b to identify the availability of the sink device 100b for reestablishing the persistent miracast session with the stored session identifier when the persistent miracast session is torn down. The controller unit 602 can be configured to receive the verification response message from the sink device 100b, wherein the verification response message indicates the availability of the sink device 100b.

The controller unit 602 can be configured to send the service discovery request message including the identifier of the source device 100a to the sink device 100b over the wireless link. The controller unit 602 can be configured to receive the service discovery response message including the session identifier from the sink device 100b. The controller unit 602 can be configured to reestablish the persistent miracast session with the sink device 100b after detecting the match between the received session identifier and the stored session identifier, where the persistent miracast session is reestablished by bypassing the capability request message, the capability response message, and the miracast session configuration.

The controller unit 602 can be configured to send the service discovery request message to the sink device 100b over the wireless link. The controller unit 602 can be configured to receive the service discovery response message including the identifier of the sink device 100b, from the sink device 100b. The controller unit 602 can be configured to verify the received identifier with the stored identifier in the source device 100a. The controller unit 602 can be configured to send the PD request message including the session identifier to the sink device 100b when the received identifier and the stored identifier are verified. The controller unit 602 can be configured to receive the PD response message from the sink device 100b, where the PD response message instructs the source device 100a to establish the persistent miracast session. The controller unit 602 can be configured to reestablish the persistent miracast session with the sink device 102, where the persistent miracast session is reestablished by bypassing the capability request message, the capability response message, and the miracast session configuration.

The controller unit 602 can be configured to send the service discovery request message to the sink device 100b over the wireless link. The controller unit 602 can be configured to receive the service discovery response message including the identifier of the sink device 100b from the sink device 100b. The controller unit 602 can be configured to verify the received identifier with the stored identifier in the source device 100a. The controller unit 602 can be configured to send the ASP session request message including the session identifier to the sink device 102 when the received identifier and the stored identifier are verified. The controller unit 602 can be configured to reestablish the persistent miracast session with the sink device 100b, where the persistent miracast session is reestablished by bypassing the capability request message, the capability response message, and the miracast session configuration.

The controller unit 602 can be configured to send the terminate request message including the tear down parameter to the sink device 100b, where the tear down parameter instructs the sink device 100b to tear down the persistent miracast session and the wireless link between the source device 100a and the sink device 100b. The controller unit 602 can be configured to receive the terminate response message from the sink device 100b. The controller unit 602 can be configured to clear the persistent miracast session resources except for the session identifier and the configuration parameters. The controller unit 602 can be configured to tear down the persistent miracast session and the wireless link with the sink device 100b.

The controller unit 602 can be configured to broadcast the device discovery request message. The controller unit 602 can be configured to receive the device discovery response message from the sink device 100b. The controller unit 602 can be configured to establish the wireless link with the sink device 100b. The controller unit 602 can be configured to send the service discovery request message including the identifier of the source device 100a to the sink device 100b over the wireless link. The controller unit 602 can be configured to receive the service discovery response message including the session identifier from the sink device 100b. The controller unit 602 can be configured to reestablish the persistent miracast session with the sink device 100b after detecting the match between the received session identifier and the stored session identifier, where the persistent miracast session is reestablished by bypassing the capability request message, the capability response message, and the miracast session configuration.

The controller unit 602 can be configured to broadcast the device discovery request message. The controller unit 602 can be configured to receive the device discovery response message from the sink device 100b. The controller unit 602 can be configured to establish the wireless link with the sink device 100b. The controller unit 602 can be configured to send the service discovery request message to the sink device 100b over the wireless link. The controller unit 602 can be configured to receive the service discovery response message including the identifier of the sink device 100b from the sink device 100b. The controller unit 602 can be configured to verify the received identifier with the stored identifier in the source device 100a. The controller unit 602 can be configured to send the PD request message including the session identifier to the sink device 100b when the received identifier and the stored identifier are verified. The controller unit 602 can be configured to receive the PD response message from the sink device 100b, where the PD response message instructs the source device 100a to reestablish the persistent miracast session. Further, the controller unit 602 can be configured to reestablish the persistent miracast session with the sink device 100b, where the persistent miracast session is reestablished by bypassing the capability request message, the capability response message, and the miracast session configuration.

The controller unit 602 can be configured to broadcast the device discovery request message. The controller unit 602 can be configured to receive the device discovery response message from sink device 100b. The controller unit 602 can be configured to establish the wireless link with the sink device 100b. The controller unit 602 can be configured to send the service discovery request message to the sink device 100b over the wireless link. The controller unit 602 can be configured to receive the service discovery response message including the identifier of the sink device 100b from the sink device 100b. The controller unit 602 can be configured to verify the received identifier with the stored identifier in the source device 100a. The controller unit 602 can be configured to send the ASP request message including the session identifier to the sink device 100b when the received identifier and the stored identifier of the sink device 100b are verified. The controller unit 602 can be configured to reestablish the persistent miracast session with the sink device 100b, where the persistent miracast session is reestablished by bypassing the capability request message, the capability response message, and the miracast session configuration.

The storage unit 604 may include one or more computer-readable storage media. The storage unit 604 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 604 may, in some examples, be considered a non-transitory storage medium. The term "non-transitory" may indicate that the storage medium is not embodied in a carrier wave or a propagated signal. However, the term "non-transitory" should not be interpreted to mean that the storage unit 604 is non-movable. For example, the storage unit 604 can be configured to store larger amounts of information than the memory. A non-transitory storage medium may store data that can, over time, change (e.g., in random access memory (RAM) or cache).

The communication unit 606 can be configured for communicating internally between the units and externally with the networks.

While FIG. 6 shows the various components of the source device 100a, it is to be understood that the source device 100a is not limited thereto, as more or less components can be used. Further, the labels or names of the components are used merely for illustrative purposes, and are not intended to limit the scope of the disclosure. One or more units can be combined together to perform the same or substantially similar functions described with respect to the source device 100a.

Figure 7:
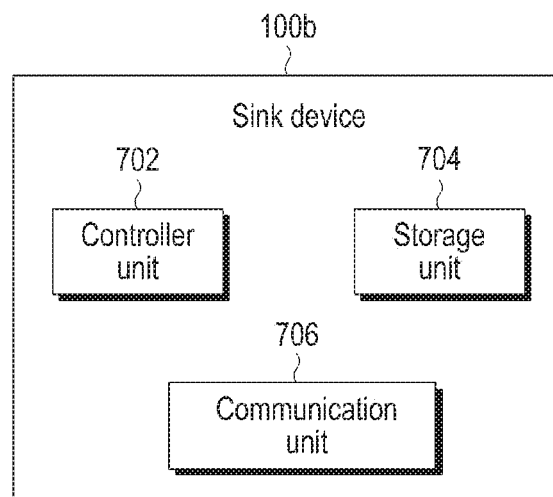
FIG. 7 is a diagram illustrating components of a sink device, according to an embodiment of the present disclosure.

FIG. 7 is a diagram illustrating the various components of the sink device 100b, according to an embodiment of the present disclosure. The sink device 100b includes a controller unit 702, a storage unit 704, and a communication unit 706.

The controller unit 702 can be configured to receive the capability request message from the source device 100a to identify whether the sink device 100b supports the persistent miracast session. The controller unit 702 can be configured to send the capability response message indicating that the sink device 100b supports the persistent miracast session to the source device 100a. Further, the controller unit 702 can be configured to receive the persistent miracast session configuration message from the source device 100a. The controller unit 702 can be configured to store at least one of the identifier of the source device 100a, the session identifier, and the configuration parameters. The controller unit 702 can be configured to send the verification response message to the source device 100a to reestablish the persistent miracast session between the source device 100a and the sink device 100b over the wireless link.

The controller unit 702 can be configured to receive the terminate request message including the tear down parameter from the source device 100a, where the tear down parameter instructs the sink device 100b to tear down the persistent miracast session and retain the wireless link between the source device 100a and the sink device 100b. The controller unit 702 can be configured to send the terminate response message to the source device 100a after receiving the terminate request message. The controller unit 702 can be configured to clear the persistent miracast session resources except the session identifier and the configuration parameters. The controller unit 702 can be configured to receive the verification request message from the source device 100a to identify the availability of the sink device 100b for reestablishing the persistent miracast session with the stored session identifier when the persistent miracast session is torn down. The controller unit 702 can be configured to send the verification response message to the source device 100a, wherein the verification response message indicates the availability of the sink device 100b.

The controller unit 702 can be configured to receive the service discovery request message including the identifier of the source device 100a from the source device 100a over the wireless link. The controller unit 702 can be configured to verify the received identifier with the stored identifier. The controller unit 702 can be configured to send the service discovery response message including the session identifier from the source device 100a.

The controller unit 702 can be configured to receive the service discovery request message from the source device 100a over the wireless link. The controller unit 702 can be configured to send the service discovery response message including the identifier of the sink device 100b to the source device 100a. The controller unit 702 can be configured to receive the PD request message including the session identifier from the source device 100a. The controller unit 702 can be configured to send the PD response message to the source device 100a, where the PD response message indicates the source device 100a to reestablish the persistent miracast session.

The controller unit 702 can be configured to receive the service discovery request message from the source device 100a over the wireless link. The controller unit 702 can be configured to send the service discovery response message including the identifier of the sink device 100b to the source device 100a. The controller unit 702 can be configured to receive the ASP request message including the session identifier from the source device 100a. The controller unit 702 can be configured to send the ASP response message to the source device 100a, where the PD response message instructs the source device 100a to reestablish the persistent miracast session.

The controller unit 702 can be configured to receive the terminate request message including the tear down parameter from the source device 100a, where the tear down parameter instructs the sink device 100b to tear down the persistent miracast session and the wireless link between the source device 100a and the sink device 100b. The controller unit 702 can be configured to send the terminate response message to the source device 100a. The controller unit 702 can be configured to clear the persistent miracast session resources except for the session identifier and the configuration parameters.

The controller unit 702 can be configured to receive the broadcasted device discovery request message from the source device 100a. The controller unit 702 can be configured to send the device discovery response message to the source device 100a for establishing the wireless link between the sink device 100b and the source device 104. The controller unit 702 can be configured to receive the service discovery response message including the identifier of the source device 100a from the source device 100a over the wireless link. The controller unit 702 can be configured to send the service discovery response message including the session identifier to the source device 100a for reestablishing the persistent miracast session.

The controller unit 702 can be configured to receive the device discovery request message broadcasted by the source device 100a. The controller unit 702 can be configured to send the device discovery response message to the source device 100a for establishing the wireless link. The controller unit 702 can be configured to receive the service discovery request message from the source device 100a over the wireless link. The controller unit 702 can be configured to send the service discovery response message including the identifier of the sink device 100b to the source device 100a. The controller unit 702 can be configured to receive the PD request message including the session identifier from the source device 100a. The controller unit 702 can be configured to send the PD response message to the source device 100a, where the PD response message instructs the source device 100a to establish the persistent miracast session.

The controller unit 702 can be configured to receive the device discovery request message broadcasted by the source device 100a. The controller unit 702 can be configured to send the device discovery response message to the source device 100a for establishing the wireless link with the sink device 100b. The controller unit 702 can be configured to receive the service discovery request message from the source device 100a over the wireless link. The controller unit 702 can be configured to send the service discovery response message including the identifier of the sink device 100b to the source device 100a. The controller unit 702 can be configured to receive the ASP session request message including the session identifier from the source device 100a.

The storage unit 704 may include one or more computer-readable storage media. The storage unit 704 may include non-volatile storage elements. Examples of such non-volatile storage elements may include magnetic hard discs, optical discs, floppy discs, flash memories, or forms of EPROM or EEPROM memories. In addition, the storage unit 704 may be considered a non-transitory storage medium, as described above.

The communication unit 706 can be configured for communicating internally between the units and externally with the networks.

While FIG. 7 shows the various components of the sink device 100b, it is to be understood that the sink device 100b is limited thereto, as more or less components can be used. Further, the labels or names of the components are used merely for illustrative purposes, and are not intended to limit the scope of the disclosure. One or more units can be combined together to perform the same or substantially similar functions described with respect to the sink device 100b.

Figure 8:
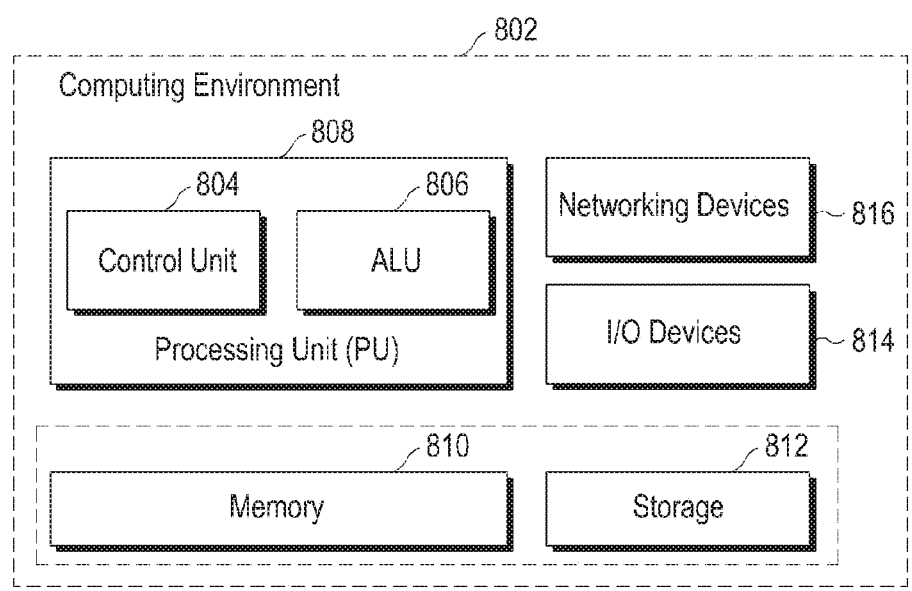
FIG. 8 is a diagram illustrating a computing environment using the method for maintaining a persistent miracast session over the wireless link, according to an embodiment of the present disclosure.

FIG. 8 is a diagram illustrating a computing environment using the method for maintaining a persistent miracast session over the wireless link, according to an embodiment of the present disclosure. As depicted in the figure, the computing environment 802 includes at least one processing unit 808 that is equipped with a control unit 804 and an arithmetic logic unit (ALU) 806, a memory 810, a storage unit 812, plurality of networking devices 816 and a plurality of input/output (I/O) devices 814. The processing unit 808 is responsible for processing the instructions of the schemes or algorithms used for implementing the methods described herein. The processing unit 808 receives commands from the control unit 804 in order to perform its processing. Further, any logical and arithmetic operations involved in the execution of the instructions are computed with the help of the ALU 806.

The overall computing environment 802 can be composed of multiple homogeneous or heterogeneous cores, multiple CPUs of different kinds, special media and other accelerators. The processing unit 808 is responsible for processing the instructions of the schemes or algorithms. Further, the plurality of processing units 808 may be located on a single chip, over multiple chips, or a system on chip (SoC).

The scheme or algorithms including the instructions and codes required for the implementation thereof are stored in either the memory unit 810 or the storage 812 or both. At the time of execution, the instructions may be fetched from the corresponding memory 810 or storage 812, and executed by the processing unit 808.

With respect to hardware implementations, various networking devices 816 or external I/O devices 814 may be connected to the computing environment 802 to support the implementation through the networking unit and the I/O device unit.

The embodiments disclosed herein can be implemented through at least one software program running on at least one hardware device, which can be used to perform network management functions to control the elements/components described with respect to FIGS. 6-8. The elements shown in the FIGS. 1 through 8 include blocks which can be at least one of a hardware device, or a combination of hardware device and software units.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof

What is claimed is:

1. A method for maintaining a persistent miracast session over a wireless link, the method comprising:
   establishing, by a source device, the persistent miracast session with a sink device;
   storing, at the source device, an identifier of the sink device, a session identifier, and configuration parameters;
   tearing down, by the source device, the persistent miracast session, while retaining the wireless link with the sink device;
   sending, by the source device, a verification request message to the sink device to identify availability of the sink device for reestablishing the persistent miracast session with the stored session identifier when the persistent miracast session is torn down; and
   receiving, by the source device, a verification response message from the sink device, wherein the verification response message indicates the availability of the sink device.

2. The method of claim 1, wherein establishing, by the source device, the persistent miracast session with the sink device comprises:
   sending a capability request message to the sink device to identify whether or not the sink device supports the persistent miracast session;
   receiving a capability response message indicating that the sink device supports the persistent miracast session from the sink device;
   sending a persistent miracast session configuration message to the sink device; and
   establishing the persistent miracast session with the sink device.

3. The method of claim 1, wherein tearing down the persistent miracast session, while retaining the wireless link with the sink device comprises:
   sending, by the source device, a terminate request message comprising a tear down parameter to the sink device, wherein the teardown parameter instructs the sink device to tear down the persistent miracast session and retain the wireless link between the source device and the sink device;
   receiving, by the source device, a terminate response message from the sink device;
   clearing, at the source device, persistent miracast session resources except for the session identifier and the configuration parameters;
   tearing down, by the source device, the persistent miracast session; and
   retaining, by the source device, the wireless link with the sink device.

4. The method of claim 3, further comprising:
   sending, by the source device, a service discovery request message comprising an identifier of the source device to the sink device over the wireless link;
   receiving, by the source device, a service discovery response message comprising the session identifier from the sink device; and
   reestablishing, by the source device, the persistent miracast session with the sink device in response to detecting a match between the received session identifier and the stored session identifier, wherein the persistent miracast session is reestablished by bypassing a capability request message, a capability response message, and a miracast session configuration.

5. The method of claim 3, further comprising:
   sending, by the source device, a service discovery request message to the sink device over the wireless link;
   receiving, by the source device, a service discovery response message comprising the identifier of the sink device from the sink device;
   verifying, by the source device, the received identifier with the stored identifier of the sink device in the source device;
   sending, by the source device, a provision discovery (PD) request message comprising the session identifier to the sink device when the received identifier of the sink device and the stored identifier of the sink device is verified;
   receiving, by the source device, a PD response message from the sink device, wherein the PD response message indicates the source device to establish the persistent miracast session; and
   reestablishing, by the source device, the persistent miracast session with the sink device, wherein the persistent miracast session is reestablished by bypassing a capability request message, a capability response message, and a miracast session configuration.

6. The method of claim 3, further comprising:
   sending, by the source device, a service discovery request message to the sink device over the wireless link;
   receiving, by the source device, a service discovery response message comprising the identifier of the sink device from the sink device;
   verifying, by the source device, the received identifier of the sink device with the stored identifier of the sink device in the source device;
   sending, by the source device, an application session protocol (ASP) session request message comprising the session identifier to the sink device when the received identifier of the sink device and the stored identifier of the sink device is verified; and
   reestablishing, by the source device, the persistent miracast session with the sink device, wherein the persistent miracast session is reestablished by bypassing a capability request message, a capability response message, and a miracast session configuration.

7. A method for maintaining a persistent miracast session over a wireless link, the method comprising:
   receiving, by a sink device, a capability request message from a source device to identify whether or not the sink device supports the persistent miracast session;
   sending, by the sink device, a capability response message indicating that the sink device supports the persistent miracast session to the source device;
   receiving, by the sink device, a persistent miracast session configuration message from the source device;
   storing, by the sink device, an identifier of the source device, a session identifier, and configuration parameters;
   tearing down, by the sink device, the persistent miracast session, while retaining the wireless link with the source device;
   receiving, by the sink device, a verification request message from the source device to identify availability of the sink device for reestablishing the persistent miracast session with the stored session identifier when the persistent miracast session is torn down; and sending, by the sink device, a verification response message to the source device, wherein the verification response message indicates the availability of the sink device.

8. The method of claim 7, wherein tearing down the persistent miracast session, while retaining the wireless link with the source device comprises:
receiving, by the sink device, a terminate request message comprising a tear down parameter from the source device, wherein the teardown parameter instructs the sink device to tear down the persistent miracast session and retain the wireless link between the source device and the sink device;
sending, by the sink device, a terminate response message to the source device in response to receiving the terminate request message; and
clearing, at the sink device, persistent miracast session resources except for the session identifier and the configuration parameters.

9. The method of claim 8, further comprising:
receiving, by the sink device, a service discovery request message comprising an identifier of the source device from the source device over the wireless link;
verifying, by the sink device, that the received identifier is the stored identifier of the source device; and
sending, by the sink device, a service discovery response message comprising the session identifier to the source device.

10. The method of claim 8, further comprising:
receiving, by the sink device, a service discovery request message from the source device over the wireless link;
sending, by the sink device, a service discovery response message comprising an identifier of the sink device to the source device;
receiving, by the sink device, a provision discovery (PD) request message comprising the session identifier from the source device; and
sending, by the sink device, a PD response message to the source device, wherein the PD response message indicates the source device to reestablish the persistent miracast session.

11. The method of claim 8, further comprising:
receiving, by the sink device, a service discovery request message from the source device over the wireless link;
sending, by the sink device, a service discovery response message comprising an identifier of the sink device to the source device;
receiving, by the sink device, an application Session protocol (ASP) request message comprising the session identifier from the source device; and
sending, by the sink device, a ASP response message to the source device, wherein the ASP response message indicates the source device to reestablish the persistent miracast session.

12. A source device for maintaining a persistent miracast session over a wireless link, the source device comprising:
a transceiver; and
at least one processor coupled to the transceiver, wherein the at least one processor is configured to:
establish the persistent miracast session with a sink device,
store an identifier of the sink device, a session identifier, and configuration parameters,
tear down the persistent miracast session, while retaining the wireless link with the sink device,
send a verification request message to the sink device to identify availability of the sink device for reestablishing the persistent miracast session with the stored session identifier when the persistent miracast session is torn down, and
receive a verification response message from the sink device, wherein the verification response message indicates the availability of the sink device.

13. A sink device for maintaining a persistent miracast session over a wireless link, the sink device comprising:
a transceiver; and
at least one processor coupled to the transceiver, wherein the at least one processor is configured to:
receive a capability request message from a source device to identify whether the sink device supports the persistent miracast session,
send a capability response message indicating that the sink device supports the persistent miracast session to the source device,
receive a persistent miracast session configuration message from the source device,
store an identifier of the source device, a session identifier, and configuration parameters,
tear down the persistent miracast session, while retaining the wireless link with the source device,
receive a verification request message from the source device to identify availability of the sink device for reestablishing the persistent miracast session with the stored session identifier when the persistent miracast session is torn down, and
send a verification response message to the source device, wherein the verification response message indicates the availability of the sink device.

* * * * *